United States Patent
Cuoghi et al.

(10) Patent No.: US 10,428,802 B2
(45) Date of Patent: Oct. 1, 2019

(54) HEATING INSTALLATION ARRANGEMENT

(71) Applicant: VESTAS WIND SYSTEMS A/S, Aarhus N (DK)

(72) Inventors: Joe Cuoghi, Ryde (GB); Adrian Edwards, Gurnard (GB); Karl Gregory, Cowes (GB); Catherine Anne McCarroll, Cowes (GB); Paul Todd, Southampton (GB)

(73) Assignee: VESTAS WIND SYSTEMS A/S, Aarhus N (DK)

( * ) Notice: Subject to any disclaimer, the term of this patent is extended or adjusted under 35 U.S.C. 154(b) by 532 days.

(21) Appl. No.: 15/036,050

(22) PCT Filed: Nov. 10, 2014

(86) PCT No.: PCT/DK2014/050372
§ 371 (c)(1),
(2) Date: May 11, 2016

(87) PCT Pub. No.: WO2015/067278
PCT Pub. Date: May 14, 2015

(65) Prior Publication Data
US 2016/0290322 A1 Oct. 6, 2016

(30) Foreign Application Priority Data
Nov. 11, 2013 (DK) .................... 2013 70662

(51) Int. Cl.
*F03D 80/40* (2016.01)
*F03D 1/06* (2006.01)
*F03D 13/10* (2016.01)

(52) U.S. Cl.
CPC .......... *F03D 80/40* (2016.05); *F03D 1/0675* (2013.01); *F03D 13/10* (2016.05);
(Continued)

(58) Field of Classification Search
CPC .... F03D 80/40; F03D 1/0675; F05B 2260/20; F05B 2260/208; F05B 2260/201; B64D 15/02; Y02E 10/721
(Continued)

(56) References Cited

U.S. PATENT DOCUMENTS 2,510,170 A * 6/1950 Chillson ................ B64D 15/02
244/134 B
2,541,661 A * 2/1951 Palmatier ............... B64D 15/02
244/134 R
(Continued)

FOREIGN PATENT DOCUMENTS

CN 1771420 A 5/2006
CN 2861580 Y 1/2007
(Continued)

OTHER PUBLICATIONS

International Search Report for PCT/DK2014/050372, dated Feb. 16, 2015.
(Continued)

*Primary Examiner* — Matthew W Jellett
(74) *Attorney, Agent, or Firm* — Patterson + Sheridan, LLP

(57) ABSTRACT

The present invention relates to a heating installation arrangement and a method of forming the heating installation arrangement for a wind turbine blade. The heating installation arrangement (100) for a wind turbine blade comprises a sleigh (101), wherein the sleigh (101) forms a platform of the heating installation arrangement (100), the sleigh further includes a recess (109), wherein the recess (109) includes one or more connection points (110, 112) for a corresponding one or more heating apparatus.

25 Claims, 4 Drawing Sheets

(52) U.S. Cl.
CPC ... *F05B 2260/201* (2013.01); *F05B 2260/208* (2013.01); *Y02E 10/721* (2013.01)

(58) Field of Classification Search
USPC .......................................................... 416/91
See application file for complete search history.

(56) References Cited

U.S. PATENT DOCUMENTS

| | | | | |
|---|---|---|---|---|
| 2,556,736 | A * | 6/1951 | Palmatier | B64D 15/02 239/76 |
| 4,295,790 | A * | 10/1981 | Eggert, Jr. | F03D 1/0675 416/226 |
| 6,003,814 | A * | 12/1999 | Pike | B64D 15/04 239/587.1 |
| 6,676,122 | B1 * | 1/2004 | Wobben | F03D 80/60 290/55 |
| 7,883,313 | B2 * | 2/2011 | Nies | F03D 1/065 415/121.2 |
| 8,029,239 | B2 * | 10/2011 | Luetze | F03D 15/05 416/91 |
| 8,100,364 | B2 * | 1/2012 | Nieman | B64D 15/04 244/134 B |
| 8,142,164 | B2 * | 3/2012 | Rao | F03D 1/0641 416/226 |
| 8,186,964 | B2 * | 5/2012 | Bell | B29C 65/48 416/226 |
| 8,267,653 | B2 * | 9/2012 | Nies | F03D 1/0633 415/1 |
| 2005/0242233 | A1 * | 11/2005 | Battisti | F03D 80/40 244/58 |
| 2006/0018752 | A1 * | 1/2006 | LeMieux | F01D 11/00 416/96 R |
| 2010/0135795 | A1 * | 6/2010 | Nies | F03D 7/042 416/1 |
| 2012/0134812 | A1 | 5/2012 | Nanukuttan et al. | |
| 2013/0101414 | A1 * | 4/2013 | Weitkamp | F03D 1/0675 416/1 |
| 2013/0106108 | A1 * | 5/2013 | De Boer | F03D 7/045 290/44 |

FOREIGN PATENT DOCUMENTS

| | | |
|---|---|---|
| CN | 101111722 A | 1/2008 |
| CN | 201081567 Y | 7/2008 |
| CN | 202673585 U | 1/2013 |
| CN | 103184984 A | 7/2013 |
| DE | 19528862 A1 | 2/1997 |
| DE | 19644355 A1 | 4/1998 |
| DE | 102010043434 A1 | 5/2012 |
| DE | 102010051293 A1 | 5/2012 |
| DE | 102010051296 A1 | 5/2012 |
| JP | 2011122533 A | 6/2011 |
| WO | 2011/127995 A1 | 10/2011 |
| WO | 2013/032166 A2 | 3/2013 |
| WO | 2014/166979 A1 | 10/2014 |

OTHER PUBLICATIONS

Danish Search Report for PA 2013 70662, dated Jun. 11, 2014.
Chinese Office Action dated Nov. 16, 2017 for Application No. 201480061432.1.

* cited by examiner

HEATING INSTALLATION ARRANGEMENT

The present invention relates to a heating installation arrangement and, in particular, to a hot air heating installation arrangement for a wind turbine blade.

Wind turbines effectively harness wind energy to generate electrical power and are becoming increasingly popular as an alternative energy source to the traditional sources for generating electrical power. Harnessing wind energy is considered to be a cleaner more sustainable source for the generation of electrical power.

In order to generate electrical power from wind energy, wind turbines typically comprise a tower that located on a foundation (e.g. a solid foundation or a floating foundation, and so on), a nacelle located on the tower to house the electrical and mechanical apparatus, such as a gearbox, a generator, drive shafts, and a rotor with one or more turbine blades connected to the nacelle via a hub. In basic and simplistic terms, the turbine blades are rotated by the incident wind energy which drives a generator to produce electrical power.

In cold climate regions, the operation of the wind turbine can be significantly degraded by ice accretion on the wind turbine blades. For example, ice accretion on the blades may change the aerodynamic shape of the blades and decrease the speed of rotation of the wind turbine resulting in significantly reduced electrical power production. The ice accretion will also add weight to the blades causing increased loads on the wind turbine and potential stress failures of the blades amongst other disadvantages caused by the buildup of ice on the wind turbine blades.

One solution to de-icing a wind turbine blade is to circulate heated air within the blade structure. The heated air transfers heat to the shell structure of the blade thereby heating the blade and subsequently enabling the removal or substantial removal of the ice accretion from the blade.

In order to circulate heated air within the blade, a heating arrangement comprising one or more fans, one or more heating elements and ducting is required to be located within the blade.

However, a wind turbine blade is a confined internal structure which presents many difficulties for installing the heating arrangement within a wind turbine blade during the manufacture process. Due to the confined space within a wind turbine blade it is also difficult for technicians to be able to enter the wind turbine blade in order to install the individual components of the heating arrangement. The heating arrangement is expected to last the lifetime of the wind turbine blade and a further problem is the ability to be able to service, maintain and/or replace the heating/fan arrangement should it require maintenance and ease of access to perform any maintenance.

The present invention seeks to address, at least in part, one or more of the problems and difficulties described hereinabove.

According to a first aspect of the present invention there is provided a heating installation arrangement for a wind turbine blade comprising: a sleigh, wherein the sleigh forms a platform of the heating installation arrangement; and the sleigh includes a recess, wherein the recess includes one or more connection points for a corresponding one or more heating apparatus.

Accordingly, the present invention provides a heating installation arrangement that comprises a sleigh, which is effectively a platform on which the heating apparatus may be located and positioned. The sleigh enables the heating installation arrangement to be advantageously formed and built separate to the wind turbine blade which significantly minimizes the production time for a wind turbine blade with heating apparatus for, e.g. de-icing the wind turbine blade. Heating installation arrangements may therefore be built or formed as a stock component and installed into wind turbine blades as a separate unit as required. The use of the sleigh also enables a more efficient installation of the heating apparatus into the wind turbine blade as the individual heating apparatus does not have to be installed separately in pieces into the, typically, small and confined space of the internal structure of a wind turbine blade.

The sleigh includes a recess which includes connection points for the heating apparatus enabling the heating apparatus to be more efficiently and effectively positioned onto the sleigh.

One or more sections of the recess may form a lower portion of ducting for channeling air flow through the heating installation arrangement. By utilizing the recess, in one or more sections, as the lower portion of the ducting for channeling the air flow then the weight of the heating installation arrangement can be advantageously reduced and provide a more efficient heating installation arrangement.

The heating installation arrangement may further comprise two or more ribs, wherein the ribs extend below the sleigh; and the two or more ribs form attachment points to attach the heating installation arrangement to an internal structure of the wind turbine blade. The two or more ribs that extend below the sleigh may provide strength to the heating installation arrangement and attachment points to the internal surface of the wind turbine blade. The ribs may attach the sleigh to the internal structure of the wind turbine blade by glue, bolts, or any other suitable attachment means.

The heating installation arrangement may comprise four ribs extending below the sleigh and spaced at substantially equal distances along the sleigh. The additional ribs may provide greater strength and stability to the heating installation arrangement and may provide additional attachment points to the internal surface/structure of the wind turbine blade. As will be appreciated there may be any number of ribs disposed at any suitable position on the sleigh.

The ribs may include an indentation or recess to act as a moisture channel to allow free drainage of any excess moisture within the spar. The indentation may be formed in the ribs at an outer portion of the rib to form the moisture channel between the rib and the internal surface of the wind turbine blade.

The ribs may include one or more access points, for example, a hatch or opening, to enable technicians to access the area under the sleigh between the sleigh and the internal surface/structure of the wind turbine blade.

The connection point in the recess may be a fan connection point and the corresponding heating apparatus may be a fan. The fan connection point in the recess may be shaped to substantially match an external profile of the fan to be installed at the fan connection point. Therefore, when constructing or building the heating installation arrangement the fan can be slotted or positioned in a correct alignment at the location where the fan is to be placed. This advantageously enables a more effective and efficient construction of the heating installation arrangement. There may be any number of fan connection points, for example, one, two, three, four, five, and so on. The number of fans and fan connection points depends on the size of wind turbine blade, the expected cold climate conditions that the wind turbine blade will be deployed and so on, in order to effectively and efficiently blow air through the heating apparatus and through the internal blade cavity.

The connection point in the recess may be a heater connection point and the corresponding heating apparatus may be a heater. The heater connection point in the recess may be shaped to substantially match an external profile of the heater to be installed at the heater connection point. Therefore, when constructing or building the heating installation arrangement the heater can be slotted or positioned in a correct alignment at the location where the heater is to be placed. This advantageously enables a more effective and efficient construction of the heating installation arrangement. There may be any number of heater connection points, for example, one, two, three, four, five, and so on. The number of heaters and heater connection points depends on the size of wind turbine blade, the expected cold climate conditions that the wind turbine blade will be deployed and so on, in order to effectively and efficiently heat the air.

The connection points, for the heating apparatus, e.g. the fans and/or the heaters, may further include attachment points to securely attach and fasten the heating apparatus to the connection point. For example, the connection point may include one or more of bolt holes to receive bolts, strap holes and/or straps, glue receiving portions, and so on.

The connection points may include one or more washers or seals to ensure that the connection points and/or heating apparatus are air tight so that no air flow is lost or escapes from the connection points.

The heating installation arrangement may further comprise one or more upper portion sections to form ducting for channeling air flow through the heating installation arrangement; and the upper portions sections may be attached to the sleigh over the recess. Therefore, the ducting for the air flow may be formed by attaching an upper portion of ducting over the recess where the recess forms the lower portion of the ducting. There may be any number of sections of the upper portion of the ducting in order to form the ducting channel for the air flow around the heating installation arrangement.

The upper portions are dimensioned to substantially match the recess width in the one or more sections such that the upper portions can be attached to the sleigh to cover the recess in the one or more sections. The upper portion of the ducting may be straight, curved or any other shape to enable the upper portion of the ducting to form, with the recess in the one or more sections, a ducting channel for the air flow through the heating installation arrangement.

The upper portion of the ducting may be securely fastened or attached to the sleigh. The upper portion of the ducting may be attached using, bolts, glue, straps, or any other fastening or attachment means to securely attach the upper portion of the ducting to the sleigh.

Washers and/or seals may be provided between the upper portion ducting sections, between the upper portion ducting and the heating apparatus (e.g. fans, heaters, and so on), and/or between the upper portion of the ducting and the sleigh in order to create an air tight seal to prevent air loss or air escaping from the heating installation arrangement.

The heating installation arrangement may further comprise an electrical junction box for connecting the heating apparatus to electrical control signals and electrical power. The electrical junction box advantageously enables the electrical devices, e.g. heating apparatus, sensors, and so on, to be connected to power supply lines and/or to control/data lines in effectively a "plug and play" manner.

The electrical junction box may be located at one end of the sleigh. Alternatively, the electrical junction box may be located at any suitable location on or near the sleigh to provide the electrical and control connections to the electrical devices.

The heating installation arrangement may further comprise one or more lifting apparatus engagement points. The lifting apparatus engagement points advantageously enable the heating installation arrangement to be lifted and installed in the internal cavity of a wind turbine blade. The lifting apparatus engagement points may include one or more of eyelet bolts on the sides or top surface of the sleigh, holes to engage lifting apparatus such as a fork lift truck, strapping to form a sling, and so on. As will be appreciated there may be provided any suitable lifting apparatus engagement points to enable the heating installation arrangement to be lifted or moved into the internal cavity of the wind turbine blade.

The recess may be a U shape; and wherein an input for air flow into the heating installation apparatus and an output for heated air flow out of the heating installation apparatus are located at one end of the sleigh. By co-locating the input and output at the same end of the sleigh advantageously aligns the holes in a spar structure in the blade to allow the air to flow in/out of the spar cavity from the heating apparatus which balances the loadings to the blade structure.

The heating installation arrangement may further comprise a flexible ducting portion at the input and/or output of the heating installation arrangement. The flexible ducting may de-couple the heating installation arrangement from noise, loads, vibration transmission that may occur when the heating installation arrangement is installed in a wind turbine blade and in operation.

The heating installation arrangement may further comprise an antler and/or an elbow ducting joints on the input and/or output of the heating installation arrangement. The antler ducting and/or elbow ducting direct the air into and receive air from internal blade cavities. The antler/elbow ducting may pass through an internal spar of the wind turbine blade.

According to a second aspect of the present invention there is provided a wind turbine blade comprising a heating installation arrangement according to one or more of the features described hereinabove.

According to a third aspect of the present invention there is provided a method of forming a heating installation arrangement comprising forming a sleigh from a composite material, wherein the sleigh is formed with a recess; and forming one or more connection points for a corresponding one or more heating apparatus in the recess.

By constructing or forming the sleigh from the composite material then the sleigh will be sufficiently strong so as to support the heating apparatus and also will not be prone to, or induce, lightning strikes to the blade as the composite material is non-metallic.

The sleigh may be formed by a moulding process in which the composite material may be laminated on a mould and then infused with a resin which may then be cured (e.g. by heating in an oven). Alternatively or additionally, the sleigh may be spray built using chopped strand matt.

It may be advantageous to form the sleigh as a single unit due to the strength and stability that a single moulded sleigh could provide, and it reduces the need for additional manufacturing steps relating to joining separate sleigh sections together and any possibly weaknesses such joins may introduce.

However, as will be appreciated, the sleigh may alternatively be formed from two or more sleigh sections that can be joined together to make a complete sleigh, in other words, in a modular design concept.

One or more sections of the recess may form a lower portion of ducting for channeling air flow through the heating installation arrangement; and attaching an upper portion for the ducting.

The connection point may be a fan connection point; wherein the heating apparatus may be a fan and attaching the fan into the fan connection point in the recess.

The connection point may be a heater connection point; wherein the heating apparatus may be a heater and attaching the heater into the heater connection point in the recess.

The method of forming the heating installation apparatus may further comprise forming two or more ribs, wherein the ribs extend below the sleigh; and the two or more ribs form attachment points to attach the heating installation arrangement to an internal structure of a wind turbine blade.

The method of forming the heating installation apparatus may further comprise forming a moisture channel in the two or more ribs to enable drainage of any excess moisture in the wind turbine blade.

The method of forming the heating installation apparatus may further comprise forming one or more access points in the two or more ribs.

The method of forming the heating installation apparatus may further comprise attaching an electrical junction box the sleigh. The electrical junction box may be connected to one or more electrical devices, e.g. heating apparatus, sensors, and so on. The electrical junction box may provide power, control and/or data lines to the electrical devices.

The method of forming the heating installation apparatus may further comprise attaching one or more sections of an upper portion of ducting to the sleigh over the recess, which forms the lower portion of the ducting to provide a ducting channel for the airflow through the heating installation arrangement.

The method of forming the heating installation apparatus may further comprise forming the sleigh in one or more sections.

The method of forming said heating installation arrangement may further comprise forming an indentation on an outer edge of said rib to form a moisture channel between said rib and an internal surface of said wind turbine blade.

The method of forming said heating installation arrangement may further comprise forming an input and an output.

The method of forming said heating installation arrangement may further comprise attaching flexible ducting to said input and/or said output to decouple said heating installation arrangement from loads, vibrations and/or noise.

The method of forming said heating installation arrangement may further comprise attaching elbow ducting and/or antler ducting to said input and/or output. The elbow and/or antler may be formed of flexible material or non-flexible-material or a combination thereof.

Embodiments of the present invention will now be described, by way of example only, and with reference to the accompanying figures, in which.

Figure 1A:
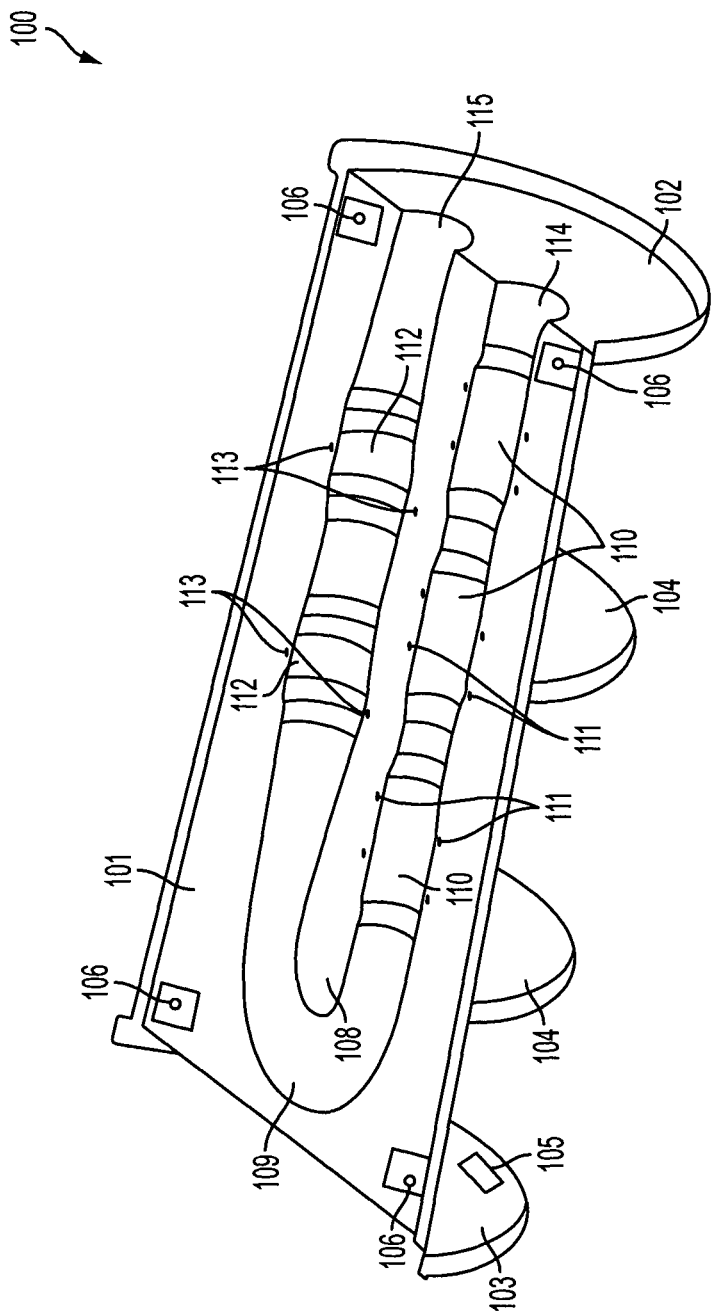
FIG. 1a shows a drawing of a sleigh according to many of the embodiments of the present invention.

FIG. 1 shows a schematic drawing of a lower portion of a heating installation arrangement 100 according to many of the embodiments of the present invention. The lower portion of the heating installation arrangement 100 comprises a sleigh 101. The sleigh 101 is effectively a platform on which heating apparatus (e.g. heaters, fans, cowls, ducting, and so on) may be integrated and/or attached, as will be described in more detail heareinbelow.

The sleigh 101 may be formed as a single unit (as shown in FIG. 1) where the sleigh may be formed from a single piece of composite material, such as E glass Glass Reinforced Plastic (GRP) and/or Prime 20 epoxy infusion resin and/or other resins such as polyester, vinylester, and so on.

By constructing or forming the sleigh 101 from the composite material then the sleigh 101 will be sufficiently strong so as to support the heating apparatus and also will not be prone to, or induce, lightning strikes to the blade as the composite material is non-metallic.

The sleigh 101 may be formed by a moulding process in which the composite material may be laminated on a mould and then infused with a resin which may then be cured (e.g. by heating in an oven). Alternatively or additionally, the sleigh may be spray built using chopped strand matt.

It may be advantageous to form the sleigh as a single unit as shown in FIG. 1 due to the strength and stability that a single moulded sleigh could provide, and it reduces the need for additional manufacturing steps relating to joining separate sleigh sections together and any possibly weaknesses such joins may introduce.

However, as will be appreciated, the sleigh may alternatively be formed from two or more sleigh sections that can be joined together to make a complete sleigh 101, in other words, in a modular design concept.

At each end of the sleigh 101, there may be a rib or fin 102, 103 extending below the bottom of the sleigh 101. The ribs 102, 103 may be integrated with the sleigh 101 or may be formed separate to the sleigh 101 and attached thereto during the manufacture of the sleigh 101.

The ribs 102, 103 may be connected to or attached to the internal blade structure of the wind turbine blade once the heating installation arrangement is installed into the wind turbine blade, for example, by gluing and/or bolting the ribs to the internal structure of the blade. The internal structure of the blade may also include guides or spars that are to be connected to the ribs. The ribs 102, 103 may also provide additional support and strength to the heating installation arrangement.

The sleigh 101 may further include one or more additional ribs 104 that extend below the sleigh 101 at predetermined positions. The one or more additional ribs 104 may provide additional support and strength to the sleigh 101 and may also provide further attachment points to attach the sleigh to the internal structure of the blade. In FIG. 1 there is shown 2 additional ribs 104 at equal distances between the two end ribs 102, 103 however, as will be appreciated, there may be any number of ribs 104 extending below the sleigh to provide stability and attachment points for the sleigh 101.

The ribs may be formed with a recess or indentation at the lower point of the rib to provide a moisture channel to enable free drainage of any excess moisture within the blade. The indentation may be located on an outer edge of the rib so that the moisture channel is formed between the rib and an internal surface of the wind turbine blade structure.

Alternatively, the sleigh 101 may not include the ribs 102, 103, and/or the additional ribs 104 such that the sleigh may be attached directly to the internal structure of the wind turbine blade.

Alternatively, or additionally, the ribs may include one or more access panels or routes to allow technicians and personnel access to the underside of the heating installation arrangement.

Figure 1B:
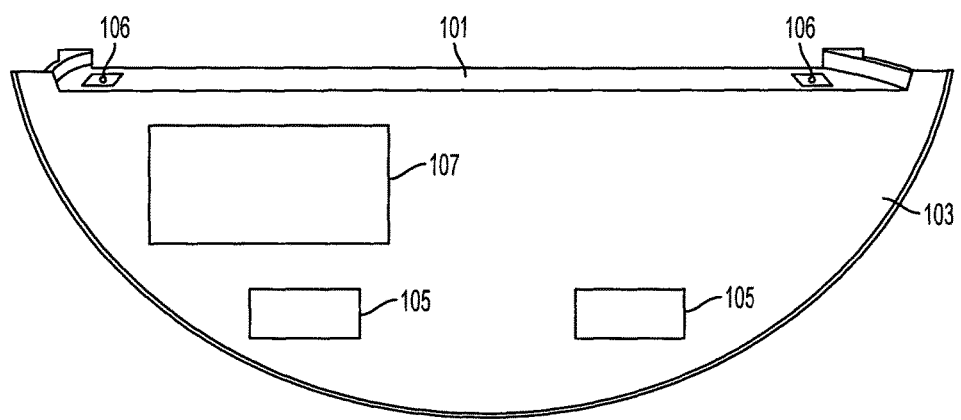
FIG. 1b shows a drawing of one end of the heating installation arrangement according to many of the embodiments of the present invention.

With reference to FIG. 1b, which shows a view of one end 103 of the sleigh 101, the end rib 103 may include openings 105 to enable a lifting means, such as a fork lift truck, a crane, or any other suitable means, to engage with the sleigh 101 to maneuver the sleigh 101 into the correct position within the internal structure of the blade. Alternatively, or additionally, the end rib 103 may include one or more couplings to couple to the lifting means.

Referring to FIG. 1a, the top of the sleigh 101 may additionally or alternatively include one or more attachment means 106, e.g. eyebolts, to operatively connect to a lifting apparatus to enable the sleigh 101 and heating installation arrangement 100 to be positioned within the internal structure of the blade. In the example shown in FIG. 1a, there are four eyebolts located in the corners of the top of the sleigh, however as will be appreciated, there may be any number of attachment means which may be located at suitable positions, e.g. the end of the sleigh, top of the sleigh, side of the sleigh, and/or bottom of the sleigh.

The heating installation arrangement may alternatively or additionally include straps to form a sling around the heating installation arrangement to aid the lifting and moving of the heating installation arrangement.

Returning to FIG. 1b, the heating apparatus to be integrated with or located in/on the sleigh to form the heating installation arrangement 100 may include one or more electrical devices such as heaters, fans, and so on. Therefore, one of the end ribs 103 of the sleigh 101 may further include an electrical connector 107, e.g. an electrical junction box. The electrical connector 107 can provide connections for electrical cabling/wiring, guides for the electrical cabling/wiring to pass through unto the sleigh, and/or the electrical connector may provide a so-called "plug and play" electrical connection to the electrical devices of the heating installation apparatus.

The electrical connector 107 may include one or more of controllers, processors, connections, memory, or any other electrical equipment necessary to power and control the electrical devices installed in or on the sleigh.

Referring to FIG. 1a, the central area of the sleigh 108 may include openings, cable guides and/or connectors for the electrical cabling/wiring to the various electrical components/devices of the heating installation arrangement. This advantageously enables the components (e.g. fans, heaters, etc.) to be conveniently and efficiently connected to power supplies and cables communicating with the components to provide control data and instructions.

The sleigh 101 is formed with a recess 109 for the installation of the components of the heating apparatus. For example, the recess 109 may be formed to enable individual components of the heating apparatus, e.g. heaters, fans, etc., to fit within the recess 109. One or more sections of the recess 109 may also form the lower portion of ducting through which the air can flow for the hot air de-icing or enable separate ducting to fit within the recess 109.

The recess 109 formed in the sleigh 101 is substantially a "U" shape in the embodiment shown in FIG. 1a. However, as will be appreciated, the recess 109 may form any suitable shape for the heating installation arrangement, for example, an "S" shape, "T" shape, "Y" shape, and so on. The recess 109 in this embodiment is a "U" shape as this enables the heating installation arrangement to be compact and simpler to install in the wind turbine blades.

Within the recess 109, there may be formed one or more fan connection points such that a fan can be located within the recess in order to blow the air through the heating apparatus. In FIG. 1a, there are shown three fan connection points 110 within which fans may be located or installed. However, as will be appreciated, the heating installation arrangement may include one or more fans in order to ensure a sufficient air flow through the heating apparatus and into the blade internal cavity.

The fan connection points 110 are formed to enable the fans to be installed and slotted into position. Therefore the shape of the recess at the fan connection points 110 is such that it matches the external shape of the fan that is to be located within the recess of the sleigh at the corresponding fan connection point 110. Either side of the recess at the fan connection points there may be connectors or openings 111 for bolts, or other coupling means, e.g. straps, to allow the fan to be securely attached to the sleigh at the fan connection point 110.

At either end of each fan there may be installed one or more seals, washers, or any other suitable means to ensure that air does not flow around or escape from the location of the fans.

Within the recess 109 there may also be formed one or more heater connection points 112 at which heaters can be located within the recess in the sleigh. In the embodiment shown in FIG. 1a, there are two heater connection points 112 but as will be appreciated there may be any number of heaters in the heating installation arrangement to ensure that the air flowing through the heating apparatus can be sufficiently heated to enable an effective and substantial de-icing of the wind turbine blade.

The heater connection points 112 are formed to enable the heaters to be installed, e.g. slotted into position, and therefore the shape of the recess at the corresponding heater connection points 112 is such that it matches the external shape of the heater that is to be located or positioned within the recess of the sleigh. Either side of the recess at the heater connection points there may be connectors 113, e.g. openings for bolts, or other coupling/attachment means, e.g. straps, to allow the heater to be securely attached to the sleigh at the heater connection point 112.

At either end of each heater there may be installed one or more seals, washers, or any other suitable means to ensure that air does not flow around or escape from the location of the heaters.

The recess 109 formed in the sleigh 101 that lies between, or connecting, the heaters and fans in the heating apparatus may be used for ducting to channel the air flow through the heating installation arrangement. Preferably, the recess 109 in the sections between the heaters, fans, input and output of the heating installation arrangement forms the lower portion of the ducting through which the air will flow. By utilizing the recess channel as the lower portion of the ducting the weight of the heating installation apparatus can advantageously be reduced as no additional separate ducting is required for the lower portion of the air flow channel.

Air may inflow to the heating installation arrangement at an input 114 and the heated air may outflow from the heating installation arrangement at an output 115.

Figure 2:
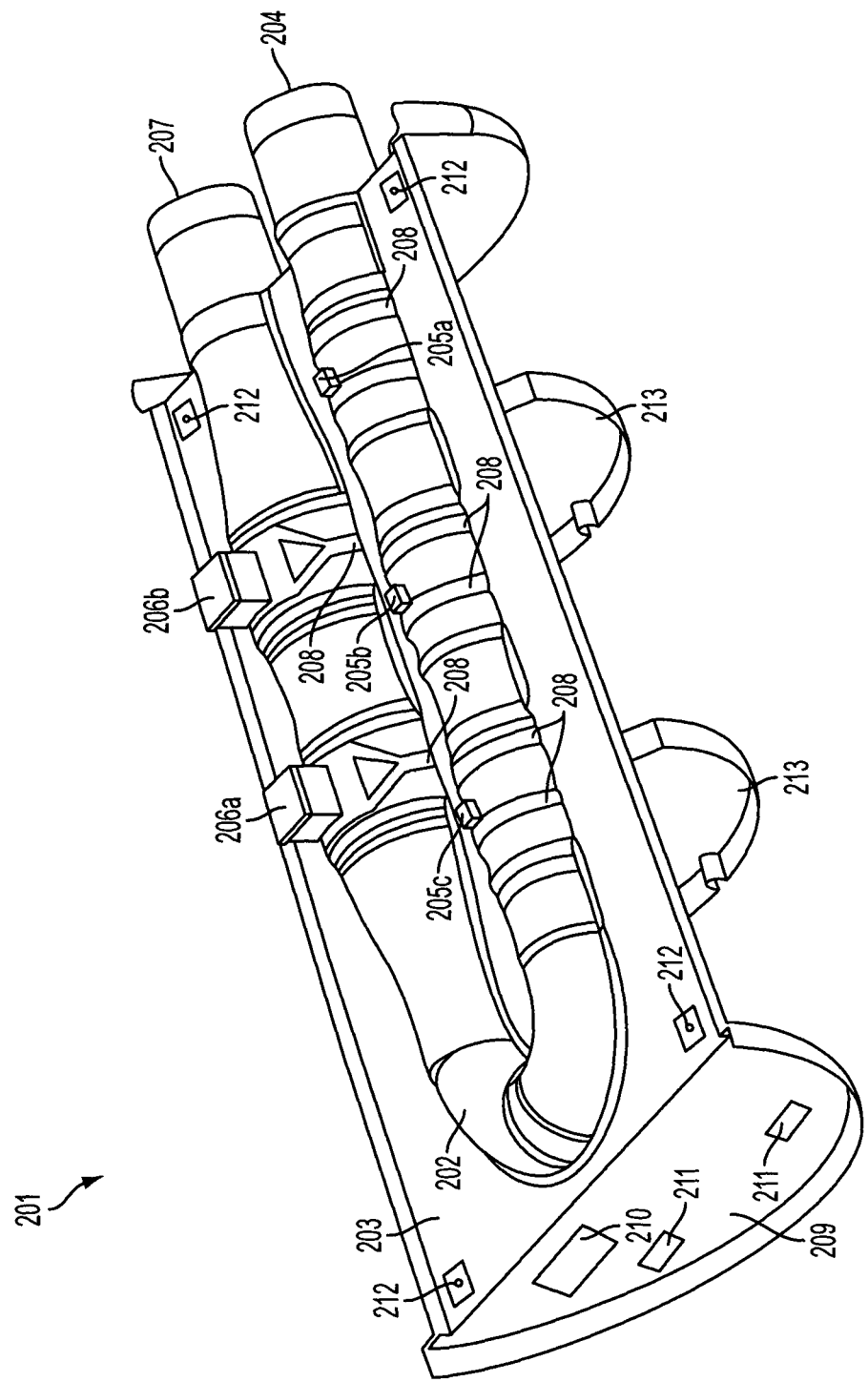
FIG. 2 shows a drawing of the heating installation arrangement according to many of the embodiments of the present invention.

FIG. 2, shows a schematic of the heating installation arrangement 201 with the upper portion of the ducting 202 attached, three fans 205 installed and two heaters 206 installed.

The upper portion of the ducting 202 may be attached to the sleigh 203 over the recess such that when the upper portion of the ducting is attached to the sleigh 203 then the combination of the lower portion formed by the recess in the sleigh 203 with the attached upper portion of the ducting 202 forms the complete ducting channel through which the air can flow.

The upper portion of the ducting is preferably formed in sections and attached to the sleigh 203 over the recess. There may be one section that connects the input 204 to the first fan 205a, one section between the first fan 205a and the second fan 205b, one section between the second fan 205b and the third fan 205c, one section between the last fan 205c and the first heater 206a forming the curved end of the "U" shape, one section between the first heater 206a and the last heater 206b, and one section between the last heater 206b and the output 207 of the heating installation arrangement.

However, as will be appreciated, there may be any number of sections of the upper portion of the ducting that is attached to the sleigh 203 in order to form the complete ducting channels in combination with the lower portion formed by the recess in the sleigh 203. For example, the section forming the curved end of the upper portion of the ducting may be formed in two or more sections.

The sleigh may include one or more connection points, e.g. holes for bolts, area for glue, or any other attachment or coupling means, e.g. straps, so that the upper portion of the ducting along with the heaters and fans can be securely fastened and attached to the sleigh. In the example shown in FIG. 2, the heaters 206 and fans 205 are securely fastened to the sleigh 203 via straps 208 and bolts. The upper portion of the ducting in this example is securely fastened to the sleigh using bolts.

Between the upper portion of the ducting and the sleigh there may be included one or more seals to form a substantially air tight seal between the upper portion of the ducting and the recess in the sleigh forming the lower portion of the ducting channel for the air flow to ensure that no air leaks or escapes from the ducting channel. Also, between each of the upper portion of the ducting sections there may also be implemented one or more seals to form a substantially air tight seal between the sections of the upper portion of the ducting to ensure that no air leaks or escapes from the ducting channel.

Alternatively, the recess may be formed such that the shape of the recess matches the external shape of ducting that could be positioned in the recess. In this arrangement the ducting will slot into the recess to form the ducting channels through which the air can flow.

As described hereinabove, in the embodiments the heating installation arrangement is a "U" shape and therefore the input air flow and output air flow of the heating installation arrangement are both located or positioned at the same end of the sleigh 203. As will be appreciated, the shape of the heating installation arrangement may be any suitable shape, e.g. an "S" shape, an "L" shape, "T" shape, "Y" shape, and so on, where the input 204 and output 207 of the heating installation arrangement may be located on different sides and or different ends of the sleigh 203.

The "U" shape is particularly advantageous as it provides a compact and efficient solution to the problems and difficulties associated with installing the heating apparatus in a wind turbine blade, which has a confined space. Furthermore, with the "U" shape the input and output are co-located at the same edge or side of the sleigh which advantageously aligns the holes in a spar structure in the blade to allow the air to flow in/out of the spar cavity from the heating apparatus which balances the loadings to the blade structure.

Figure 3:
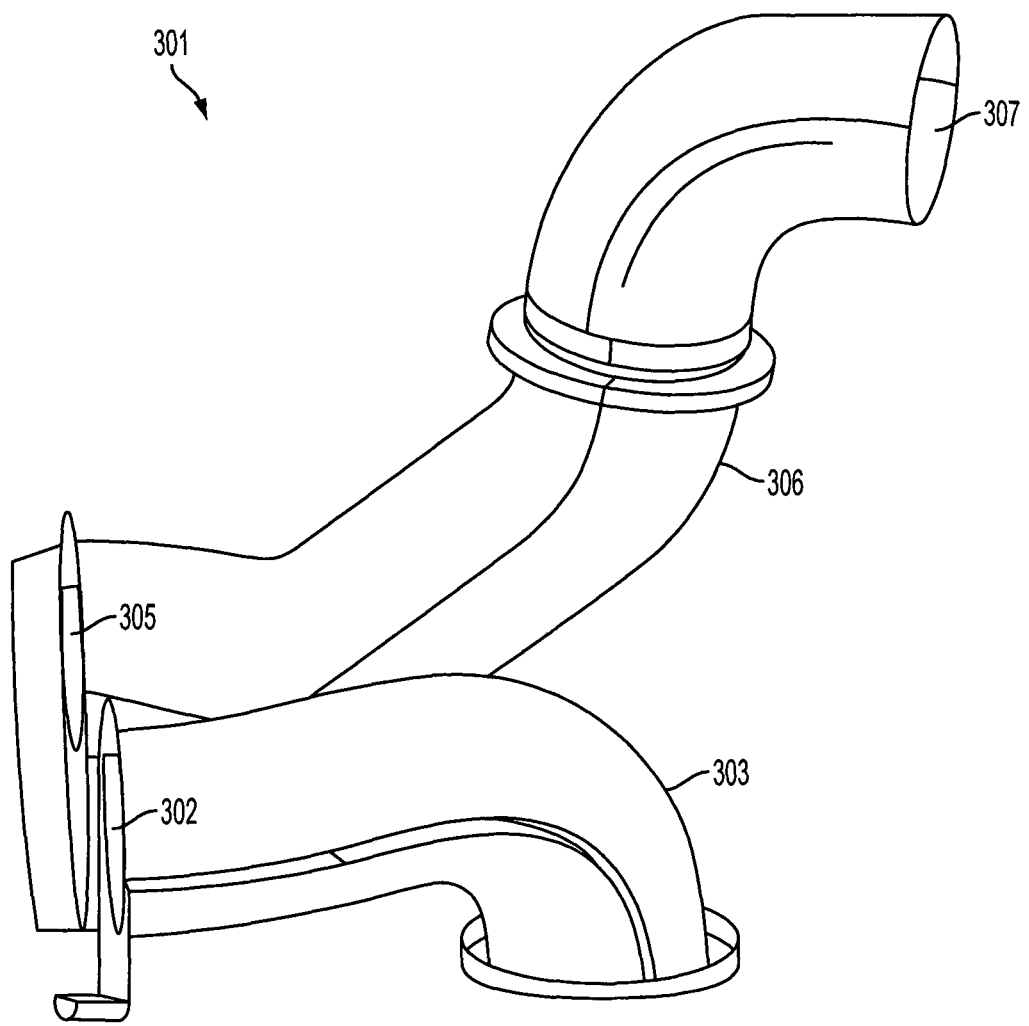
FIG. 3 shows a drawing of an input and output arrangement according to many of the embodiments of the present invention.

An example of the input and output channel arrangement 301 is shown in FIG. 3. On the input side 302 there is provided an antler duct 303 the end 304 of which passes through the spar structure within the blade cavity to enable air flow into the heating installation arrangement from the leading edge cavity within the blade structure. On the output side 305 there is provided an elbow duct 306 the end 307 of which passes through the spar structure within the blade cavity to enable heated air to flow from the heating installation arrangement to the trailing edge cavity within the blade structure. As will be appreciated, the structure and arrangement of the input and/or output channels may be any suitable arrangement to direct the air flow from the heating installation arrangement to one or more internal cavities in the blade structure and also to receive air flow from one or more internal cavities in the blade structure to the heating installation arrangement. The output of the heating installation arrangement may alternatively or additionally channel heated air into the leading edge cavity and the input of the heating installation arrangement may alternatively or additionally receive air flow from the trailing edge cavity of the blade structure.

On the input and/or output of the heating installation arrangement there may be provided one or more flexible ducting portions. The flexible ducting may de-couple the heating installation arrangement from noise, loads, and/or vibration transmission that may occur when the heating installation arrangement is installed in a wind turbine blade and in operation.

Returning to FIG. 2, one end 209 of the sleigh 203 may include an electronic junction box 210 and one or more connection points 211 to which lifting gear or apparatus, e.g. a fork lift truck, may engage to lift the heating installation arrangement 201. The top of the sleigh 203 may alternatively or additionally include one or more attachment points 212, e.g. eye bolts, to enable lifting apparatus, e.g. a crane, to engage or attach to the sleigh 203 to enable the heating installation arrangement to be lifted or winched into the internal blade cavity.

Accordingly, the heating installation arrangement can be effectively positioned within the blade internal cavity via the lifting apparatus.

The ribs 213 extending below the sleigh 203 provide strength and support to the heating installation arrangement and/or provide connection points to securely attach the heating installation arrangement to the internal structure of the wind turbine blade.

One end of the sleigh may also include one or more access points to enable technicians to access the heating installation arrangement and the underside of the heating installation arrangement. The ribs of the heating installation arrangement may also be provided with access points for technicians to be able to access one or more areas and structures of the heating installation arrangement.

The heating installation arrangement shown in FIG. 2, includes three fans 205 and two heaters 206 however, as will be appreciated there may be any number of fans and/or heaters in the heating installation arrangement as required to sufficiently heat the air flow and to provide a sufficient flow of heated air into the size of blade that is to be de-iced.

The dimensions of the heating installation arrangement will be appropriate for the size of blade and the size of the internal blade cavity in which the heating apparatus is to be installed. For example, the dimensions of the sleigh may be 5 meters×2 meters×0.5 meters to be installed in a blade internal cavity having a root diameter dimension of 2.4 meters. However, as will be appreciated, different blades for different types of wind turbines may have different dimensions and therefore, the heating installation arrangement can be of any suitable dimensions in order to fit inside the blade that the heating apparatus will be installed within.

As described hereinabove, the sleigh and ribs may be formed from a composite material which is both lightweight and does not induce lightning strikes to the wind turbine or wind turbine blade. The sleigh and ribs may be formed as a single piece or may be formed in sections which are joined together, e.g. using glue, bolts, or other fastening means. The sleigh and ribs may be formed using a universal mould or a mould that is designed for the specific size and shape of each wind turbine blade cavity that the heating installation arrangement may be installed. The mould may be infused with the composite material in resin form and cured, e.g. in an oven, to become a solid structure. The fans, heaters and upper portion of the ducting may then be securely attached or fastened to the sleigh in order to form the complete heating installation arrangement which may then be installed within the internal blade cavity.

The embodiments of the present invention describe a heating installation apparatus that has many advantages. The heating apparatus can be manufactured separately to the blade and then lifted into the blade internal cavity to be attached and installed. This means that the difficulty in installing the heating apparatus is advantageously reduced as the separate parts of the heating apparatus do not need to be installed separately by technicians in the confined space of the blade internal cavity.

By forming and manufacturing the heating installation apparatus separately or remotely to the blade production then the production time of the blade is also reduced or minimised. This is because the heating installation arrangement is built separately to the blade production and is installed into the blade once the heating installation apparatus and the blade have been built. Therefore, any number of heating installation arrangements can be formed and built so that they are ready to be installed in any number of blades as and when required.

Furthermore, the ability to maintain and repair the heating apparatus when installed using the described heating installation arrangement is more effective and efficient.

While embodiments of the invention have been shown and described, it will be understood that such embodiments are described by way of example only. Numerous variations, changes and substitutions will occur to those skilled in the art without departing from the scope of the present invention as defined by the appended claims. Accordingly, it is intended that the following claims cover all such variations or equivalents as fall within the spirit and the scope of the invention.

What is claimed is:

1. A heating installation arrangement for a wind turbine blade comprising:
    a sleigh within the wind turbine blade, wherein the sleigh forms a platform of the heating installation arrangement; and
    wherein a portion of the sleigh forms a recess within the sleigh, wherein the recess forms a lower portion of an air flow channel, wherein the air flow channel comprises an air input and an air output, wherein one or more connection points are disposed within the recess and correspond to one or more heating apparatuses also disposed within the recess and the air flow channel, wherein the one or more heating apparatuses are disposed between the air input and the air output of the air flow channel, wherein the one or more heating apparatuses comprise one or more of a heater and a fan.

2. The heating installation arrangement as claimed in claim 1, in which one or more sections of said recess form a lower portion of ducting for channeling air flow through said heating installation arrangement.

3. The heating installation arrangement as claimed in claim 1, further comprising:
    two or more ribs, wherein the two or more ribs extend below said sleigh; and
    wherein the two or more ribs form attachment points to attach said heating installation arrangement to an internal structure of said wind turbine blade.

4. The heating installation arrangement as claimed in claim 3, further comprising:
    four ribs extending below said sleigh and spaced at substantially equal distances along the sleigh.

5. The heating installation arrangement as claimed in claim 3 in which the two or more ribs further comprise an indentation on an outer edge of said rib to form a moisture channel between said rib and an internal surface of said wind turbine blade.

6. The heating installation arrangement as claimed in claim 3, in which said ribs further comprise one or more access points to provide access to an area below said sleigh.

7. The heating installation arrangement as claimed in claim 1, wherein one of the one or more connection points comprises a fan connection point;
    wherein one of the one or more heating apparatuses comprises a fan; and
    said fan connection point in said recess is shaped to substantially match an external profile of said fan installed at said fan connection point.

8. The heating installation arrangement as claimed in claim 1 wherein one of the one or more connection points comprises a heater connection point;
    wherein one of the one or more heating apparatuses comprises a heater; and
    said heater connection point in said recess is shaped to substantially match an external profile of said heater installed at said heater connection point.

9. The heating installation arrangement as claimed in claim 1 further comprising:
    one or more upper portion sections to form ducting for channeling air flow through said heating installation arrangement; and
    wherein the one or more upper portions sections are attached to said sleigh over said recess.

10. The heating installation arrangement as claimed in claim 1 further comprising:
    an electrical junction box for connecting said heating apparatus to electrical control signals and electrical power.

11. The heating installation arrangement as claimed in claim 1 further comprising:
    one or more lifting apparatus engagement points.

12. The heating installation arrangement as claimed in claim 1 in which said recess is a U shape; and wherein an input for air flow into said heating installation apparatus and an output for heated air flow out of said heating installation apparatus are located at one end of said sleigh.

13. The heating installation arrangement as claimed in claim 1, in which said sleigh further comprises an input and an output wherein air flows into said heating installation arrangement via said input and air flows out of said heating installation arrangement via said output.

14. The heating installation arrangement as claimed in claim 13 further comprising flexible ducting at said input or said output to decouple said heating installation arrangement from loads, vibrations, and noise.

15. The heating installation arrangement as claimed in claim 13, in which said input further comprises a duct to direct air flow into said heating installation arrangement.

16. The heating installation arrangement as claimed in claim 13, in which said output further comprises a duct to direct air flow into said wind turbine blade.

17. A method of forming a heating installation arrangement comprising:
    forming a sleigh for a wind turbine blade from a composite material, wherein a portion of the sleigh is formed with a recess within the sleigh, wherein the recess forms a lower portion of an air flow channel, wherein the air flow channel comprises an air input and an air output; and
    forming one or more connection points within the recess for a corresponding one or more heating apparatuses disposed within said recess and the air flow channel, wherein the one or more heating apparatuses are disposed between the air input and the air output of the air flow channel, wherein the one or more heating apparatuses comprise one or more of a heater and a fan.

18. The method of forming said heating installation arrangement as claimed in claim 17 in which one or more sections of said recess form a lower portion of ducting for channeling air flow through said heating installation arrangement; and
    attaching an upper portion for said ducting.

19. The method of forming said heating installation arrangement as claimed in claim 17 in which said, wherein one of the one or more connection points comprises a fan connection point; and
    attaching a fan into said fan connection point in said recess.

20. The method of forming said heating installation arrangement as claimed in claim 17, wherein one of the one or more connection points comprises a heater connection point; and
    attaching a heater into said heater connection point in said recess.

21. The method of forming said heating installation arrangement as claimed in claim 17 further comprising:
    forming two or more ribs, wherein said ribs extend below said sleigh; and
    said two or more ribs form attachment points to attach said heating installation arrangement to an internal structure of a wind turbine blade.

22. The method of forming said heating installation arrangement as claimed in claim 21, further comprising forming an indentation on an outer edge of said rib to form a moisture channel between said rib and an internal surface of said wind turbine blade.

23. The method of forming said heating installation arrangement as claimed in claim 17, further comprising forming an input and an output.

24. The method of forming said heating installation arrangement as claimed in claim 23, further comprising attaching flexible ducting to said input or said output to decouple said heating installation arrangement from loads, vibrations and noise.

25. The method of forming said heating installation arrangement as claimed in claim 23, further comprising attaching ducting to said input and output to direct air flow into said wind turbine blade.

\* \* \* \* \*